C. E. GAGE.
Sack Scales.
No. 68,728.
Patented Sept. 10, 1867.
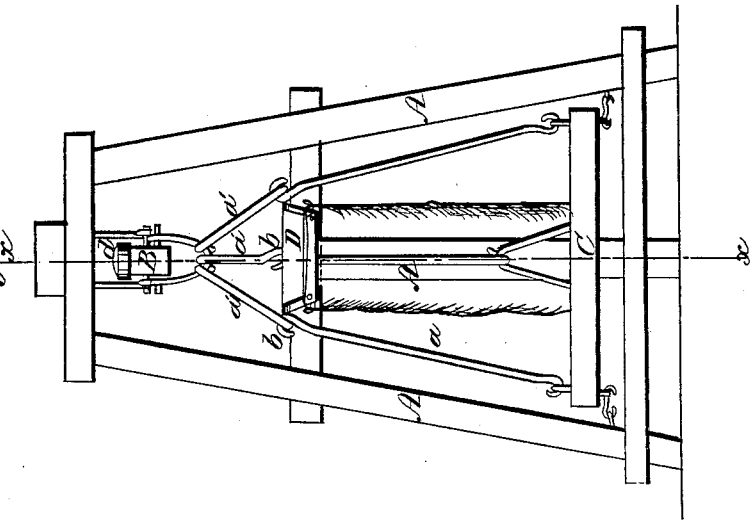
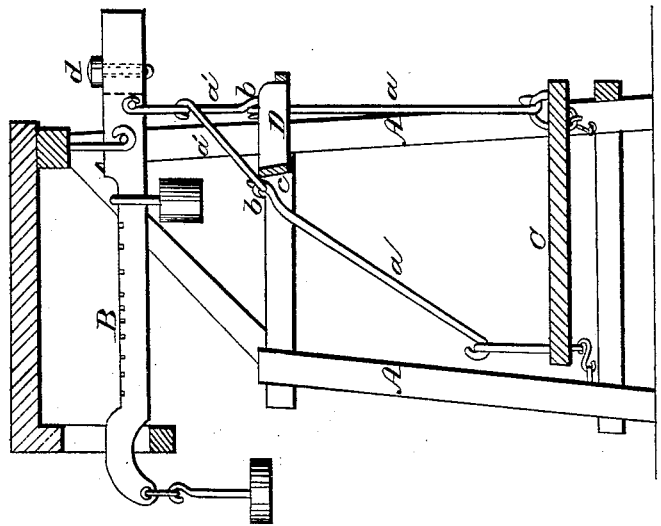

United States Patent Office.

C. E. GAGE, OF FOND DU LAC, WISCONSIN.

Letters Patent No. 68,728, dated September 10, 1867.

---

IMPROVED WEIGHING-SCALE.

---

The Schedule referred to in these Letters Patent and making part of the same.

---

TO ALL WHOM IT MAY CONCERN:

Be it known that I, C. E. GAGE, of Fond du Lac, in the county of Fond du Lac, and State of Wisconsin, have invented new and useful improvements in Suspension Beam-Scales; and I do hereby declare that the following is a full, clear, and exact description thereof, which will enable others skilled in the art to make and use the same, reference being had to the accompanying drawings, forming part of this specification, in which—

Figure 1 is a vertical section taken in the line $x\,x$, fig. 2.

Figure 2, a front end view.

Similar letters of reference indicate like parts.

This invention relates to improvements in a suspension beam-scale for weighing heavy weights and grain in bags, and consists in attaching a bag-holder to the beam for weighing grain, and a device for balancing the scale, as hereinafter described.

A A A are the legs of an ordinary tripod beam-scale, on which is hung the beam B, made and connected as usual to the top of the frame. A platform, C, is suspended by three rods to the beam. The suspension-rods are made in two sections, $a\,a'$, connected with each other by hooks or links $b$. A bag-holder, D, is attached to the suspension-rods at the connections $b$ in such manner that it may be raised and lowered, so as to adapt its height to any sized bags, and allow them to touch the platform C for support, when desired. The bag-holder is made bell-mouthed, and hooks $c\,c$ are placed on the outside at the four corners to catch the edge of the bag and hold it open to receive the grain, &c., to be weighed. The rear end of the beam has a verticel mortise through it in which is placed an adjustable weight, $d$, to balance the scale with the bag off or on, instead of moving a suspended weight on the beam as usual. On each leg is fixed a staple, $e$, connected with hooks on the under side of the platform C, and thus keeps it steady in place for weighing.

What I claim as new, and desire to secure by Letters Patent, is—

1. Arranging a bag-holder, D, in connection with the suspension-rods of the scale, as and for the purpose specified.

2. Balancing the scale with an adjustable weight, $d$, in a vertical mortise in the rear of the beam, as described.

C. E. GAGE.

Witnesses:
J. M. RIKER,
H. W. DURAND.